United States Patent [19]
Crocitti et al.

[11] Patent Number: 5,822,004
[45] Date of Patent: *Oct. 13, 1998

[54] ADAPTIVE QUANTIFICATION BASED ON ACTUAL AND PREDICTED IMAGE DATA AMOUNTS

[75] Inventors: Valerie Crocitti, Lingolsheim, France; Michel Kerdranvat, Bischoffsheim, France

[73] Assignee: Thomson multimedia S.A., Courbevoie, France

[*] Notice: This patent issued on a continued prosecution application filed under 37 CFR 1.53(d), and is subject to the twenty year patent term provisions of 35 U.S.C. 154(a)(2).

[21] Appl. No.: 486,963

[22] Filed: Jun. 7, 1995

[30] Foreign Application Priority Data

Jun. 22, 1994 [FR] France .................................. 94 07676

[51] Int. Cl.$^6$ ...................................................... H04N 7/24
[52] U.S. Cl. ........................................... 348/405; 348/419
[58] Field of Search ..................................... 348/405, 419, 348/409, 404, 403, 390, 384; 382/251, 232; 341/200; H04N 7/13

[56] References Cited

U.S. PATENT DOCUMENTS

| | | | |
|---|---|---|---|
| 5,136,371 | 8/1992 | Savatier et al. | 348/419 |
| 5,241,383 | 8/1993 | Chen et al. | 348/405 |
| 5,459,515 | 10/1995 | Chevance et al. | 348/419 |

*Primary Examiner*—Bryan Tung
*Attorney, Agent, or Firm*—Joseph S. Tripoli; Frederick A. Wein; Eric P. Herrmann

[57] ABSTRACT

A procedure for quantification of coefficients in a variable data rate image compression system, in the form of blocks and macroblocks, the system including circuitry for transformation of blocks of pixels into blocks of coefficients, circuitry for quantification of these coefficients, circuitry for storage of coded information before transmission, and circuitry for regulation of quantification as a function of the state of the circuitry for storage. The procedure is such that each image is divided into groups of blocks, at least when a so-called current image must be coded in inter mode, a quantifier is determined at the start of the current image, the quantifier being corrected by a correction coefficient recalculated before the quantification of at least one of the groups, the coefficient being a function of the difference between, first, the number of bits produced for all the groups of blocks previously coded and, secondly, a prediction of this number of bits, the prediction being based on the distribution of the bits during the coding of at least one image preceding the current image. The invention is applicable notably in the field of image compression at low data transmission rates.

22 Claims, 3 Drawing Sheets

ADAPTIVE QUANTIFICATION BASED ON ACTUAL AND PREDICTED IMAGE DATA AMOUNTS

BACKGROUND OF THE INVENTION

The present invention concerns a procedure for quantification of coefficients in an image compression system and more particularly the regulation of the output buffer by the quantification of transformation coefficients. The invention is applicable in the field of data transmission, notably the transmission of compressed images at low data rates in visio-telephone applications.

SUMMARY OF THE INVENTION

The purpose of the invention is a procedure for quantification of coefficients, in a variable data rate image compression system, in the form of blocks and macro-blocks, said system including means of transformation of blocks of pixels into blocks of coefficients, means of quantification of these coefficients, means of storage of coded information before transmission, and means of regulation of means of quantification as a function of the state of the means of storage, wherein each image being divided into groups of blocks,
at least when a so-called current image must be coded in inter mode, a quantifier is determined at the start of the current image, said quantifier being corrected by a correction coefficient recalculated before the quantification of at least one of said groups,
said coefficient being a function of the difference between, first, the number of bits produced for all the groups of blocks previously coded and, secondly, a prediction of this number of bits,
said prediction being based on the distribution of the bits during the coding of at least one image preceding the current image.

In this way we take account of the distribution of the information in the preceding images when coding the current image. This is useful in that the information is not generally distributed uniformly across an image.

According to a particular embodiment of the invention, the calculation of the correction coefficient is carried out at least at the start of each line of macro-blocks.

According to a particular embodiment of the invention, the said prediction (bitpred[mb]) is obtained using the equation:

$$bitpred[mb]=a*bitp[mb]_0+b*bitp[mb]_{i-1}$$

where a and b are weighting coefficients; bitp[mb]hd 0is a function giving, for the last image coded in intra mode, the ratio between the number of bits used up to macro-block mb and the total number of bits used; bit[mb]$_{i-1}$ is a similar function for the last image coded.

We therefore take into account of the last image coded in intra mode, that undergoes less (or no) correction to the quantifier. The number of bits necessary to code different zones or blocks of this intra image therefore provide a good idea of the distribution of the information in the image.

According to a particular embodiment of the invention, the correction coefficient is such that:

$$c2=c*(Bi\_mb-bitpred[mb]*Btarg_i)/R$$

where Btarg$_i$ is the target number of bits to use for the coding of the current image; R is the data output transmission rate from the buffer; c is a coefficient.

According to a particular embodiment of the invention, if Bav is an average value of the number of bits necessary to code an image and Btarg$_i$ is the target number of bits to use for the coding of the current image, the quantifier chosen at the start of the image is:

the average quantifier of the previous image if $\alpha$Bav<Btarg$_i$<$\beta$Bav (where $\alpha$, $\beta$ are positive and $\alpha$<$\beta$),
the average quantifier (qav1, qav2) of the last image satisfying the condition Btarg$\leq\alpha$Bav, or $\beta$Bav$\leq$Btarg if, for the current image, the same condition is satisfied with Btarg$_i$.

According to a particular embodiment of the invention, the target number of bits allocated for use for the coding of an image is a function of the state of filling of the buffer at the start of the coding of the image.

According to a particular embodiment of the invention, a minimum value for the quantifier is imposed, so that, if the sum of the quantifier chosen at the start of image and the correction coefficient is less than this minimum value, the quantifier used then takes this minimum value.

According to a particular embodiment of the invention, a maximum value (qmax) for the quantifier (q) is imposed so that if the sum of the quantifier chosen at the start of the image (qav, qav1, qav2) and the correction coefficient (c2) is greater than this maximum value (qmax), the quantifier used (q) then takes this maximum value.

According to a particular embodiment of the invention, the minimum value (qmin) (or maximum value (qmax)) is fixed at the start of the image, according to the ratio of the target number of bits to use for the coding of the current image (Btarg) to the average number of bits used for the coding of an image (Bav).

According to a particular embodiment of the invention, the minimum and/or maximum values (qmin, qmax) are adjusted after each calculation of the correction coefficient (c2), by taking into account the evolution of this coefficient over at least the previous line of macro-blocks.

According to a particular embodiment of the invention, a new calculation of the correction coefficient (c2) is carried out for each of the macro-blocks of the last line of macro-blocks.

Another purpose of the invention is a procedure for the quantification of coefficients in a variable data rate image compression system wherein the regulation of the quantification of coefficients obtained during the compression of an image is made notably as a function of the distribution of the information in the preceding images.

BRIEF DESCRIPTION OF THE DRAWINGS

The invention will be better understood and other advantages and characteristics will become clear on reading the following description making reference to the appended figures, of which:

FIG. 1 shows a schematic representation of the operation of a hybrid compression device including the prediction, transformation, and estimation of movement.

Figure 1:
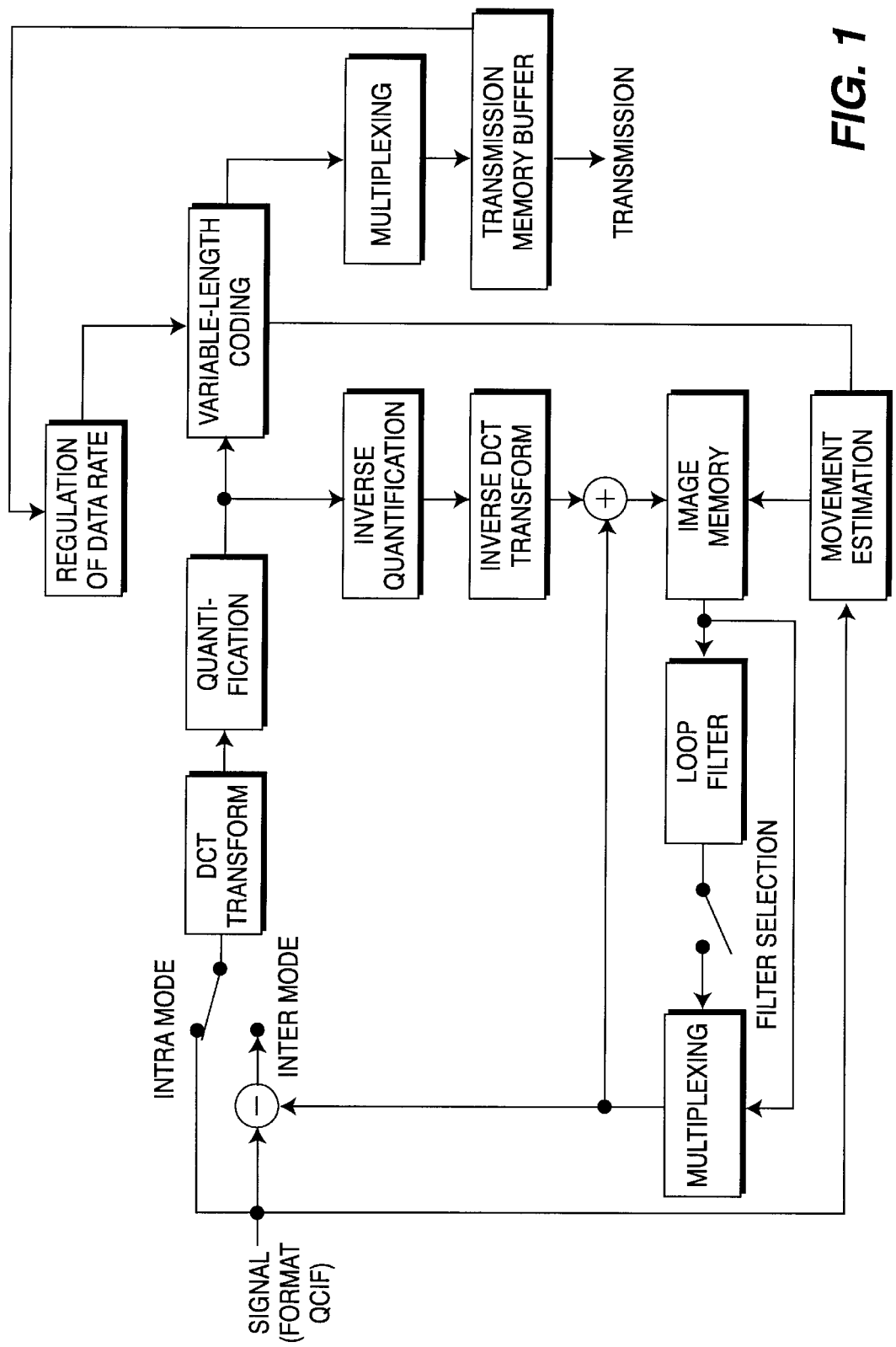
FIG. 1 shows a general functional diagram of a compression device.

In this example, the images to be processed are in QCIF ("Quarter Common Intermediate Format") format, whose resolution is 176*144 pixels for luminance Y and 88*72 pixels for each of the color components dR and dB. Each image therefore includes 99 macro-blocks for the luminance. These macro-blocks of 16*16 pixels are organized into 9 lines of 11 macro-blocks.

The QCIF format is described in more detail in the CCITT standard H261.

In the rest of this description only the coding of the luminance will be considered.

In the present example, the images can be coded using two modes: intra mode or inter mode. An image coded in intra mode can be decoded without reference to another image of the sequence of images. An image coded in inter makes reference to an reference image, stored in an image memory. This reference image corresponds to the one decoded by the decoder.

First, we shall describe the coding of an image in intra mode. The image is divided into blocks of 8*8 pixels, which undergo an orthogonal discrete cosine transform (DCT) into the frequency domain. The transformation coefficients obtained in this way are quantified, coded using a variable-length code and multiplexed with system data, then stored in a buffer memory while awaiting their transmission at a fixed data rate.

In parallel, the coder decodes the blocks which it has just coded in order to estimate the error made during the coding. The coefficients quantified are dequantified, and then undergo an inverse discrete cosine transform. The image obtained is then stored in the reference image memory.

The coding of an image in inter mode is more complex: in addition to the process just described, the image undergoes, first, a differentiation with respect to the reference image and, secondly, an estimation of movement. For each macro-block of the current image, we determine a movement vector with respect to a macro-block of the reference image. The macro-block of the reference image is the macro-block which is considered to contain the information that is closest to that contained in the current macro-block. This vector, once it has been coded using a variable-length code, is multiplexed with the macro-block and stored in the buffer memory.

Once the movement vector has been determined, we calculate the difference between the current macro-block and the reference image corresponding to the movement vector. The four resulting blocks of differences of pixels then undergo, as before, the cosine transform and the quantification, then the dequantification and the inverse cosine transform before being reintroduced into the reference image.

The blocks and macro-blocks taken from the reference memory are possibly filtered before being subtracted from the current image.

A choice of the compression mode (inter or intra) could also be made for each separate macro-block.

Finally, a block is not necessarily coded: if the difference between a block and the corresponding block of the reference image is very small, no transformation coefficient will be transmitted. However, we would indicate in the corresponding macro-block header that the coefficients for this block are not being sent.

The amount of information finally obtained for each macro-block during the storage in the buffer memory depends on many factors: the compression mode, the simple or complex nature of the image, the type of variable-length code, the type of movement estimation, the quantification, etc. The transmission rate of data to the buffer memory (also referred to simply as the "buffer") is therefore by nature variable. Given that a transmission line has a maximum data rate that is always finite, and generally fixed, the buffer may overflow when the transmission line can not handle rapidly enough all the information stored in the buffer (overflow); inversely, the buffer may empty more quickly than it is filled (underflow).

Generally, the rate of data transmission from the buffer can not be adapted, so it is necessary to adjust the rate of data transfer into the buffer to avoid overflow or underflow. The regulating factors habitually used are the quantification step and the variable-length code. The case of variable-length code will not be described here in more detail since, in the framework of the invention, we are mainly interested in the adaptation of the quantification step.

When the buffer becomes full, the coding must stop (even if certain images are not coded) until the buffer has emptied enough for new data to be sent to it. When the buffer is empty, packing bits are sent to it.

As mentioned earlier, a block of 8*8 pixels undergoes a DCT, which enables a block of coefficients of same dimensions to be obtained. The coefficient located at the upper left of this block is the coefficient of the continuous component. The farther away a coefficient is from this block, the higher the corresponding frequency.

The DCT coefficients obtained are located in the range [−2048;+2047].

The DCT coefficient representing the continuous component of the transformed block is generally quantified with a fixed, relatively small quantification step: in effect, the variations of the continuous component are highly visible on the screen and contribute heavily to the "block effect" that is particularly visible in the graduations of the luminance. Moreover, the difference between the coefficient of continuous component and the coefficient previously obtained is generally coded. For the other 63 coefficients of each block of 8*8 pixels, we use a quantification step "q" that can change from one macro-block to another. (In a variant of the embodiment, the quantification step q can change for each block. It would also be possible to define different quantification matrices and to choose one rather than another, depending on predefined criteria).

The special processing reserved for the continuous component coefficient is carried out only for images coded in intra mode. When an image is coded in inter mode, the whole macro-block is quantified in a single quantification step.

In the present embodiment, the quantification step q is an integer between 1 and 31. The quantification consists in dividing each coefficient by 2 times q. For example, if q is equal to 31, all coefficients will be quantified with a step of 64. A coefficient in the range [−2048;+2047] will be compressed into the range [−32;+31]. We see therefore that the number of bits produced is an inverse function of the quantification step. We note that a priori there is no linear relation between the number of bits finally written in the buffer and the quantifier, since the quantified coefficients undergo other compression processes and since supplementary data are added (movement vectors, miscellaneous information). However, the variation of the number of bits produced as a function of the quantifier is globally verified.

In the rest of this description the following variables will be used:

| | |
|---|---|
| • q | Quantifier |
| • qav | Average quantifier of the preceding image |
| • c2 | Correction made to obtain q for the current line |
| • pc2 | Correction used for the previous line of macro-blocks |
| • ppc2 | Correction used for the line of macro-blocks before the preceding line |
| • qav1 | Average value of q on an image previously coded and responding to certain criteria |
| • qav2 | Similar to qav1 |
| • qmin | Minimum value of q ($\geq 1$) |
| • qmax | Maximum value of q ($\leq 31$) |
| • Bi__mb | Number of bits already produced for all the macro-blocks of the current image located before the current macro-block |
| • mb | Number of the current macro-block (from 1 to 99) |
| • Btarg | Target number of bits to produce for the current image |
| • Bav | Average number of bits to produce per image |
| • Bmax | Maximum value of Btarg (taken as equal to 2*Bav) |
| • Bsize | Buffer size |
| • R | Output data rate of the buffer |
| • bitp[mb] | Percentage of Btarg used up to the current macro-block |
| • NQ | Total number of quantifiers (31 in the present case) |
| • Buffer__status | Degree of filling of the buffer |

The indices indicate the number of an image; the index 0 indicates the first image coded.

The numerical values given are those corresponding to the present embodiment.

At the start, the buffer is empty and buffer__status=0.

The first image to code is coded in intra mode, the reference memory being empty or containing data not correlated with the first image. We fix the quantification step q0 for all this image. The smaller this coefficient, the better the starting image quality will be, but the larger will be the number of bits necessary to code this image. This will affect the number of bits available for the coding of the images that follow. In the present example, we take q0=25.

The image is then coded. This coding enables us to determine the distribution of the information in the image being processed, by calculating for each macro-block (or each line of macro-blocks) the ratio of the number of bits produced for the block (or the line) and the total number of bits produced for the whole image.

Figure 2:
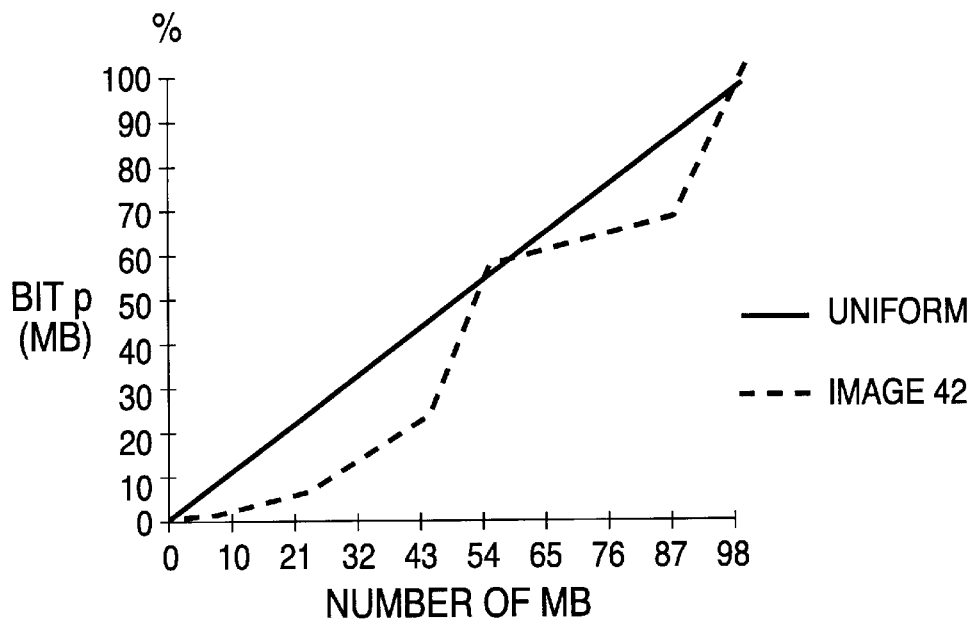
FIG. 2 shows the distribution of the information in a test image compared with an image with a uniform distribution.

FIG. 2 shows this distribution for a test image (the dashed curve is for the "42" image), with respect to an image of uniform distribution (bisector). The higher the slope of a curve for a line of macro-blocks, the larger the number bits produced by the macro-blocks of this line (cumulation function).

We note that in the general case, the information tends to be denser towards the center of the image, which leads to steeper slopes for the central lines of macro-blocks.

The distribution information thus determined is memorized as a table, in the form of a cumulation of percentages up to a given macro-block (or line of macro-blocks). This cumulation is bitp[mb], where mb is the number of the current macro-block; it is equal to the percentage of the total number of bits dedicated to an image that have already been necessary to code the macro-blocks preceding the current macro-block. This information will be used to determine the corrections to make to the quantifier for the images that follow, by providing a prediction of the number of bits necessary for a given line of macro-blocks. Consequently:

bitp[mb]=(sum(for i=1 to mb−1) of the bits which were needed to code the macro-block i)/total number of bits to code the image.

If i is the current image, then the values of the prediction function bitpred[mb] used for the calculations concerning this image i will be determined by an equation of the type:

$$bitpred[mb] = a*bitp[mb]_0 + b*bitp[mb]_{i-1}$$

We therefore take into account the last image coded in intra mode (image 0) and the last image coded (image i−1) preceding the current image i).

The weighting coefficients a and b balance the variations of the values of bitp[mb] of the preceding image by enabling a reference to the last image coded in intra. A high value of a with respect to b will limit the influence of these variations.

A ratio a:b of 4:1 has given good results.

When an image i has been coded, we of course memorize the values actually obtained for the corresponding function bitp[mb]$_i$.

After coding the first image, the buffer is no longer empty. The state of the buffer will be used to determine the number of bits Btarg allocated theoretically for the coding of the following image. We must afterwards try to respect this target number.

We assume that we know the average number of bits necessary to code an image; we shall call this Bav. It depends on the output data rate of the buffer and on the frequency of the images to be coded.

Figure 3:
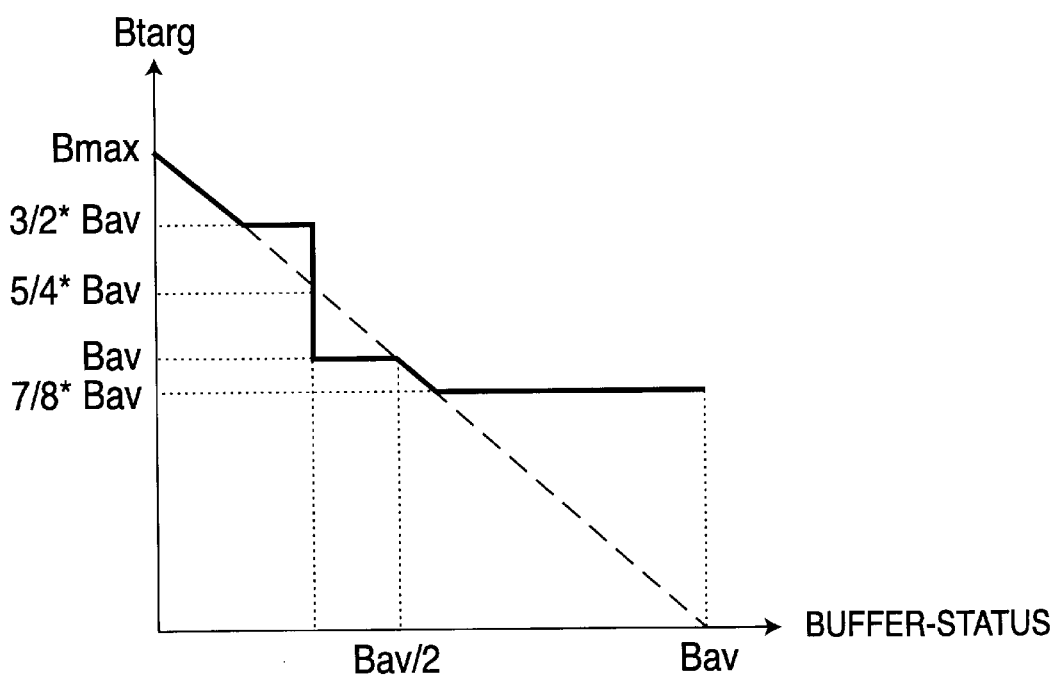
FIG. 3 is a diagram showing the choice of the number of bits allocated to an inter image, taking into account the state of filling of the buffer.

The choice of Btarg is determined by the following equation:

$$Btarg = Bmax*(1 - buffer\_status/Bsize)$$

where Bmax is the maximum number of bits allocated to an image (even if possibly this number can be exceeded in practice), and where Bsize is the size of the buffer in bits. In the present example, Bsize=Bav. FIG. 3 shows a diagram where the function above is shown as a dotted line. The bold line shows the function actually used; this function includes a certain number of limitations. However, the function Btarg=f(Buffer__status) is generally a decreasing function, which indicates that when the buffer is filled, the number of bits allocated for an image diminishes. Nevertheless, we use a minimum threshold for the number of bits allocated to an image. In the present embodiment, this threshold is close to, though smaller than, Bav.

The quantifier of the first line of macro-blocks of an inter image is chosen as follows:

| | |
|---|---|
| If Btarg $\leq \alpha$Bav | then q = qav1 |
| If $\alpha$Bav < Btarg < $\beta$Bav | then q = qav |
| If Btarg $\geq$ Bav | then q = qav2 |

In the present embodiment, respective values for $\alpha$ and $\beta$ of 1 and of 1.5 have given good results.

qav is the average quantifier of the preceding image.

qav1 represents the average quantifier of the last image for which Btarg$\leq \alpha$Bav.

qav2 represents the average quantifier of the last image for which Btarg$\geq \beta$Bav.

Thus we obtain a quantifier which takes into account the quantifiers of the preceding images.

In a variant, we use default values of qav1 and qav2 when no average could be determined in the preceding images.

From time to time, it is necessary to force the coding into intra mode to eliminate an accumulation of defects in the reference memories of the coder and the decoder, or when a change of scene occurs and inter coding is no longer viable. In this case, the whole process is started again.

We next determine a correction coefficient of the quantifier that will be added to this quantifier. This correction coefficient, denoted c2 in the text below, is given by:

$$c2=c*(Bi\_mb-bitpred[mb]*Btarg)/R$$

where Bi_mb is the number of bits actually produced for the present image for the macro-blocks located before the current macro-block. We see that the term in parentheses corresponds to the difference between the number of bits actually produced and the number of bits expected by the distribution function bitpred[mb] (taking account of Btarg). c2 can be positive or negative, depending on whether the expected number of bits is exceeded or not. If the number of bits used before the coding of macro-block mb is greater than the number of bits expected, then c2 will be positive. The quantifier will therefore be increased and we will reduce the number of bits resulting from the current line of macro-blocks.

C is a coefficient that depends on the data transmission rate R and the possible variations between the number of bits produced and the number of bits expected. The larger the chosen value of c, the more rapid will be the variations introduced by c2. C2 is of the order of magnitude of q in absolute value.

For example, for a data rate R of 20,000 bit/s and a prediction error of a few hundred bits, we choose c to be about 100 to 1,000.

In the present example, the quantifier is refreshed to the start of each line of macro-block (except the first line). We therefore calculate a correction coefficient c2 at the start of line. This avoids a change of the quality of the image in a horizontal band of the image. Of course, it is possible to calculate c2, and therefore refreshment q for all the macro-blocks.

According to a preferred variant of the embodiment, we refresh q at the start of each line of macro-blocks, except for the last line, for which the refreshment is carried out macro-block by macro-block. This enables improved correction of any possible variations of the number of bits effectively used with respect to Btarg, notably in a line of macro-blocks not located in the center of the image.

If we do have values of bitpred[mb] only for the start of each line of macro-blocks, we carry out a linear interpolation of the last value (start of the last line) up to the 100%.

In a variant of the embodiment, c2 is weighted as follows: if qav>20 then c=600, otherwise, c=300. In this way the effect of c2 is increased when the quantifier is large.

We set q=qav+c2; qav keeps the value chosen at the start of image for the whole image (qav, qav1 or qav2).

In a variant of the embodiment, we carry out a supplementary correction on the limits imposed on q. We determine minimum and maximum values, respectively qmin and qmax. When q becomes less than qmin, we set it to qmin; when q is greater than qmax, we set it to qmax.

At the start of image, we fix starting values of qmin and qmax. These values can be constant (for example, qmin=8 and qmax=23), or, in a preferred variant, result from a comparison between Btarg and Bav.

If Btarg is less than Bav, this means the current image will have to be coded with relatively few bits. Consequently, we increase the value of qmin (for example, qmin=11 instead of 8) to avoid quantification steps that are too small, which would lead to too great a flow of bits into the buffer.

If Btarg is greater than Bav, in particular if Btarg is very much larger than Bav, we will choose a small value of qmin (for example, 6 instead of 8).

A similar determination is carried out for qmax.

The value of qmin is revised during the coding of the image. If the resulting number of bits at a given moment in the coding of a certain number of macro-blocks is below what we expected, then qmin is reduced. Inversely, when we exceed the expected number, qmin is increased. However, c2 can take large values, which introduce very sudden variations, which we must seek to attenuate.

Figure 4:
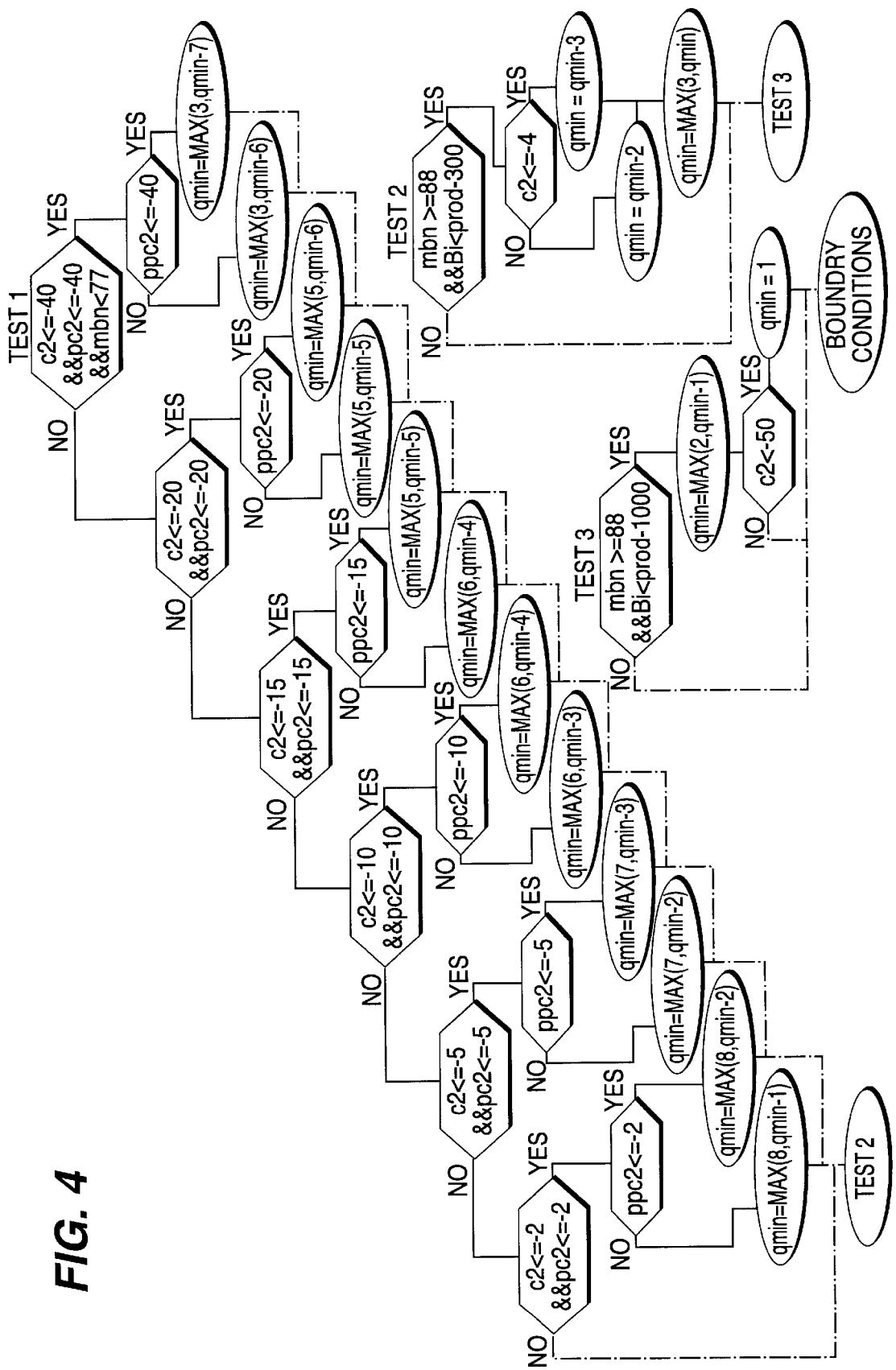
FIG. 4 is an organigram explaining the corrections made to the minimum value qmin authorized for the quantifier.

FIG. 4 illustrates the corrections made to a qmin at the start of the line in the form of three successive tests. We shall call the value of c2 of the preceding line pc2 and the value of c2 of the line before the preceding line ppc2. We recall that the more the value of c2 is negative, the more there is under-production of bits with respect to the value of Btarg fixed at the start of image.

If pc2≦(c2+2), then we set qmin=max(qmin−1, pq−1), where pq is the quantifier used for the preceding line, qmin having the value fixed as a function of Btarg and Bav.

Test 1, destined to decrease qmin in the event of underproduction of bits (c2<0), is designed to take account of c2, pc2 and ppc2, i.e. of the evolution of the correction coefficients over several lines.

We define a series of possible negatives values for c2, pc2 and ppc2. In the present example, these values are between −40 and −2: −2, −5, −10, −15, −20, −40. The coefficients can be less than −40.

By starting with the lowest value, we determine whether c2 and pc2 are less than this value. If so, then we determine whether ppc2 is also less than this value. This shows whether the corrections made have been of same over two or three lines. The lower the test value, the more qmin will be reduced. However, if qmin was very high, we take account of this fact by setting qmin=max (x, qmin−y), where x is the value of qmin associated with the test value and y is an integer which increases when the test value becomes more negative.

If ppc2 does not satisfy the preceding condition, qmin is not reduced in the same way, the downward trend not being the same on the three lasts lines of macro-blocks.

Once this test 1 is complete, qmin is at least equal to 3.

Tests 2 and 3 are applied only for the last line of macro-blocks, in the case where a strong correction is necessary to correct the deviations with respect to the predictions and, in this specific case, an under-production of bits. In effect, the corrections made by the first test do not enable the lowest values of the quantifier to be attained.

Test 2 comes into play if we are 10% below the predictions at the start of last line, whereas test 3 is used when we are about 25% below the predictions.

Only in the case of test 3 is the value qmin=1 attained.

The purpose of the "limiting conditions" applied after the three tests is to force the use of the maximum quantifier value (31) in the case where the number of bits produced is very close to the total number of allocated bits Btarg. This situation occurs at the end of the image. The test then avoids an overflow of low value with respect to Btarg. The "limiting condition" test can also be carried out at another moment—after tests 1 to 3.

In a variant of the embodiment, Qmax also undergoes a correction. The higher the quantifier, the more the image, once it is decoded, will be degraded. It is therefore important of to use high quantification values only knowingly.

According to another variant of the embodiment, we make an extra correction of the quantifier in order to take account, for the quantifier of the current line, of the percentage of bits expected for the current line. Previously, the corrections discussed took account only of the lines previously coded.

It is obvious that the numerical data values given above are only examples and in no way limit the scope of the invention.

According to the embodiment described, the images can be coded in inter or intra mode. It is clear that the invention is not limited to such a system and can easily be adapted to systems also making use of a bi-directional coding mode.

What is claimed is:

1. Procedure for quantification of coefficients, in a variable data rate image compression system, in the form of blocks and macro-blocks, said system comprising:

means of transformation of blocks of pixels into blocks of coefficients, means of quantification of the transformed coefficients, means of storage of coded information before transmission, and means of regulation of said means of quantification as a function of the state of the means of storage, wherein each of a plurality of images is divided into groups of blocks, and wherein at least when a so-called current image must be coded in inter mode, a quantifier q is determined at the start of the current image, said quantifier being corrected by a correction coefficient recalculated before quantification of at least one of said groups of blocks, said correction coefficient being a function of the difference between, first, the number of bits produced for all the groups of blocks in the current image previously coded Bi mb and, secondly, a prediction of said number of bits bitpred(mb), said prediction being based on the distribution of bits during coding of at least one image preceding the current image.

2. Procedure according to claim 1, wherein the recalculation of said correction coefficient is carried out at least at the start of each line of macro-blocks.

3. Procedure according to claim 2, wherein said prediction bitpred(mb) is obtained using the equation:

$$bitpred(mb)=a*bitp(mb)o+b*bitp(mb)_{i-1}$$

where a and b are weighting coefficients, bitp(mb)o represents the ratio between the number of bits used up to a macro-block mb for the last image coded in intra mode and the total number of bits used, and bit(mb)$_{i-1}$ represents the ratio between the number of bits used up to the macro-block mb for the last image coded and the total number of bits used.

4. Procedure according to claim 3, wherein said correction coefficient is defined by:

$$c*(Bi\_mb-bitpred(mb)*Btarg_i)/R$$

where Btargj is the target number of bits for coding of the current image, R is the output data transmission rate of the coded information storage means, and c is a coefficient.

5. Procedure according to claim 4, wherein the target number of bits allocated for coding of an image Btarg is a function of the state of filling of the coded information storage means at the start of the coding of the image.

6. Procedure according to claim 1, wherein, if Bav is an average value of the number of bits necessary to code an image and Btarg$_i$ is the target number of bits for coding of the current image, then the quantifier q chosen at the start of an image is:

the average quantifier qav of the preceding image if $\alpha Bav < \beta targ_i < \beta Bav$ where $\alpha$ and $\beta$ are positive and $\alpha < \beta$, the average quantifier qav1 of the last image for which Btarg$_i \leq \alpha$Bav, or the average quantifier gav2 of the last image for which Btarg$_i$ $\beta$Bav.

7. Procedure according to claim 1, wherein a minimum value qmin for the quantifier q is fixed so that, if the sum of the quantifier chosen at the start of an image and the correction coefficient is less than said minimum value qmin, then the quantifier used takes said minimum value.

8. Procedure according to claim 7, wherein the minimum value qmin, and a maximum value qmax are fixed at the start of an image, according to the ratio of the target number of bits for coding of the current image Btarg to the average number of bits used for coding an image Bav.

9. Procedure according to claim 7, wherein the minimum and/or maximum values are adjusted after each recalculation of the correction coefficient, taking account of the evolution of the correction coefficient over at least a preceding line of macro-blocks.

10. Procedure according to claim 1, wherein a maximum value qmax for the quantifier q is fixed so that, if the sum of the quantifier chosen at the start of an image and the correction coefficient is greater than said maximum value qmax, then the quantifier used q takes said maximum value.

11. Procedure according to claim 1, wherein a new calculation of the correction coefficient is carried out for each of the macro-blocks of a last line of macroblocks.

12. Apparatus for quantification of coefficients in a variable data rate image compression system, said apparatus comprising:

means for transformation of blocks of pixels into blocks of coefficients, means for quantification of the transformed coefficients, means for storage of coded information before transmission, and means for regulation of the means of quantification as a function of the state of the means of storage, wherein each of a plurality of images is divided into groups of blocks, means for determining a quantifier q at the start of a current image, said quantifier being corrected by a correction coefficient recalculated before quantification of at least one of said groups of blocks, said correction coefficient being a function of the difference between the number of bits produced for all the groups of blocks in the current image previously coded Bi mb and a prediction of said number of bits bitpred (mb) said prediction being based on the distribution of bits during coding of at least one image preceding the current image.

13. The apparatus according to claim 12, wherein the recalculation of said correction coefficient is carried out at least at the start of each line of a plurality of lines of macroblocks.

14. The apparatus according to claim 13, wherein said prediction bitpred (mb) is obtained using the equation;

$$bitpred(mb)=a*bitp(mb)o+b*bitp(mb)_{i-1}$$

where a and b are weighting coefficients, bitp(mb)$_o$ represents the ratio between the number of bits used up to a macro-block mb for the last image coded and the number of bits used.

15. The apparatus according to claim 14 wherein said correction coefficient is defined by:

$$c*(Bi\_mb-bitpred(mb)*Btarg_i)/R$$

where Btarg$_i$ is a target number of bits for coding the current image, R is the output data transmission rate of the storage means, and c is a coefficient.

16. The apparatus according to claim 15, wherein the target number of bits allocated for coding an image Btarg is a function of the state of filling of a buffer at the start of the coding of the image.

17. The apparatus according to claim 16, wherein a minimum value qmin, and a maximum value qmax are fixed at the start of an image according to the ratio of the target number of bits for coding of the current image Btarg to the average number of bits used for coding an image Bav.

18. The apparatus according to claim 16, wherein one of minimum qmin and maximum qmax values are adjusted after each recalculation of the correction coefficient taking account of an evolution of said coefficient over at least a preceding line of macro-blocks.

19. The apparatus according to claim 12, wherein, when a Bav is an average value of the number of bits necessary to code an image and $Btarg_i$ is the target number of bits for coding of the current image, a quantifier q chosen at the start of image is:

an average quantifier qav of the preceding image when $\alpha Bav < \beta targ_i < \beta Bav$ where $\alpha$ and $\beta$ are positive and $\alpha < \beta$, an average quantifier qav1 of the an image for which $Btarg_i \leq \alpha Bav$, or an average quantifier qav2 of the last image for which $Btarg_i \geq \beta Bav$.

20. The apparatus according to claim 12, wherein a predetermined minimum value qmin for the quantifier q is determined in order that the sum of the quantifier chosen at the start of an image and the correction coefficient is greater than said minimum value qmin, with the quantifier used taking said minimum value.

21. The apparatus according to claim 12, wherein a predetermined maximum value qmax for the quantifier q is determined in order that the sum of the quantifier chosen at the start of an image and a correction coefficient is greater than said maximum value qmax, with the quantifier used taking said maximum value.

22. The apparatus according to claim 12, wherein a new calculation of the correction coefficient is carried out for each macro-block of a last line of a plurality of lines of macro-blocks.

* * * * *